United States Patent [19]
Gianforcaro et al.

[11] 4,259,082
[45] Mar. 31, 1981

[54] PROCESS FOR PURIFYING SODIUM SULFATE CRYSTALS

[75] Inventors: Gregory J. Gianforcaro, West Chester; Robert E. Lighton, Media, both of Pa.; Jerald M. Dougherty, Winslow, Me.

[73] Assignee: Scott Paper Company, Philadelphia, Pa.

[21] Appl. No.: 46,338

[22] Filed: Jun. 7, 1979

[51] Int. Cl.$^3$ .................. C01D 5/16; D21C 11/10
[52] U.S. Cl. .................. 23/302 T; 162/30 K; 162/DIG. 8
[58] Field of Search .................. 23/302 T, 302 R; 210/73 R, 71, 84; 162/30 K, DIG. 8

[56] References Cited
U.S. PATENT DOCUMENTS

| | | | |
|---|---|---|---|
| 2,887,360 | 5/1959 | Hoekse | 23/302 T |
| 3,236,590 | 2/1966 | Sopchak et al. | 23/302 T |
| 3,950,217 | 4/1976 | Reeve | 162/30 K |
| 4,086,329 | 4/1978 | Cowley et al. | 423/478 |

Primary Examiner—Frank W. Lutter
Assistant Examiner—Gregory N. Clements
Attorney, Agent, or Firm—Nicholas J. DeBenedictis; John W. Kane, Jr.; William J. Foley

[57] ABSTRACT

Sodium sulfate crystals, also known as salt cake, are obtained as a side stream in the manufacture of chlorine dioxide by the reduction of sodium chlorate with chloride ions in an aqueous, acidic medium containing sulfate ions. The sodium sulfate crystals are contained in a mother liquor saturated with sodium sulfate and contaminated with chloride ions. The process provided by the present invention purifies the salt cake crystals by separating the crystals from the mother liquor without evaporation of the mother liquor until a critical dryness level is achieved and then the remaining mother liquor is evaporated to result in purified salt cake crystals having substantially reduced chloride ion content.

2 Claims, 1 Drawing Figure

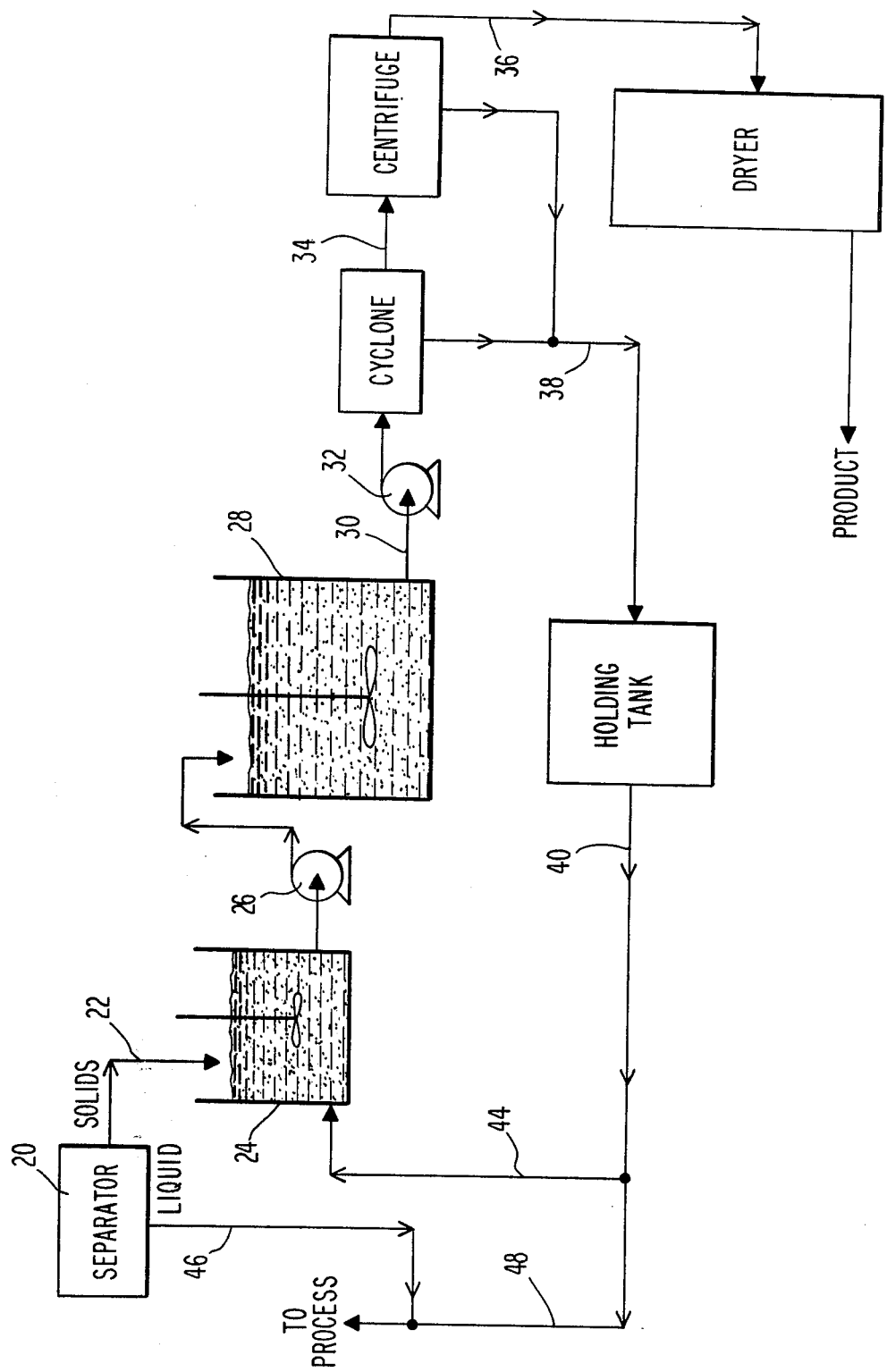

PROCESS FOR PURIFYING SODIUM SULFATE CRYSTALS

TECHNICAL FIELD

The present invention provides an approved method of purifying sodium sulfate associated with the generation of chloride dioxide.

BACKGROUND ART

The separation of sodium sulfate (salt cake) crystals from a mother liquor obtained during the production of chlorine dioxide has been disclosed in patents such as U.S. Pat. No. 4,086,329 entitled INTEGRATED CHLORINE DIOXIDE PRODUCING SYSTEM, Inventors: Gerald Cowley et al. The present invention further purifies such salt cake crystals. The sodium sulfate crystals (22) obtained from separator 20 shown in FIG. 1 of U.S. Pat. No. 4,086,329 contains substantial quantities of chloride ions associated with the crystals. Because of the presence of the chloride ions and because of the large particle size of the crystals, the impure crystals may not be suitable for many purposes. In particular, due to the chloride and chlorate contamination, the sodium sulfate crystals should not be used as a source of sodium sulfate in the makeup of pulping liquor in a kraft pulping process because the chloride ions would introduce substantial corrosion problems particularly in the recovery boilers of conventional kraft pulping processes.

DISCLOSURE OF INVENTION

The present invention provides a purification process for sodium sulfate crystals having associated therewith a sodium sulfate mother liquor containing chloride ions. The purification process comprises the steps of:

(a) slurrying impure sodium sulfate crystals obtained intermittently from a chlorine dioxide generation process with a mother liquor in a slurry tank;

(b) transferring the slurry into a first holding tank;

(c) transferring slurry from the first holding tank to a separation step;

(d) separating the crystals from the mother liquor without substantial evaporation of the mother liquor to yield crystals having less than 10% mother liquor remaining thereon;

(e) drying the crystals after separation step d to evaporate the remaining mother liquor and produce a sodium sulfate crystal in the particle size of about 100% by weight passing through a 45 mesh screen and at least 90% retained on 200 mesh screen (Tyler series) and having less than 0.2% chloride ions;

(f) collecting the mother liquor from the separation step;

(g) transferring the collected mother liquor to a second holding tank;

(h) transfering mother liquor from the second holding tank and recycling it to the slurry tank for slurry make up;

(i) removing mother liquor as a bleed stream to control the total chloride ion content of the mother liquor;

(j) transferring mother liquor without crystals in place of the transfer of slurry in steps b and c when the amount of impure sodium sulfate crystals from the chlorine dioxide generation process is less than a predetermined amount for efficient operation of said separating step;

(k) pumping the mother liquor or slurry through conduits to effectuate transfer thereof in steps b, c, g, h, and j without the addition of water during pumping;

(l) maintaining the mother liquor and slurry in said tanks and during transfer in steps b, c; g, h and j at a pH of at least 7 and at a temperature greater than 65° C. (150° F.) by heating in the tanks and without adding heat through the transfer conduits; and (m) flushing all transfer conduits with water at a temperature of about 65° C. (150° F.) to remove all slurry and mother liquor prior to any cooling of the contents of said tanks and transfer conduits below 65° C. (150° F.) in preparation for a shut down of the process and cooling down of the transfer conduits;

BEST MODE FOR CARRYING OUT THE INVENTION

The improved purification process of the present invention begins with the step of slurrying impure sodium sulfate crystals obtained from a separator of a chlorine dioxide generating process such as that shown in U.S. Pat. No. 4,086,329 FIG. 1, item 20. The chlorine dioxide generation process is a service process to the primary process of producing bleached pulp. Accordingly, the production rate and production schedule of the pulp for bleaching dictates the quantity of chlorine dioxide to be produced by the chlorine dioxide generating process. The production schedule of chlorine dioxide is not independently controlled but is controlled in response to the needs of the pulping and bleaching processes. Therefore, the production of sodium sulfate from separator 20 is not independently controlled but depends upon the production rate of chlorine dioxide which in turn depends upon the needs of the pulp bleaching process.

The production rate of impure sodium sulfate from the chlorine dioxide generating process varies significantly and is stopped completely when the chlorine dioxide process is shut down because of a shutdown in the pulping or bleaching processes. The purification of sodium sulfate from this intermittent source of impure sodium sulfate presents substantial difficulties which are overcome by the improved purification process provided herein.

The individual process steps of the improved purification process are more particularly described as follows:

SLURRYING

Impure sodium sulfate crystals from a chlorine dioxide generating process such as the sodium sulfate designated as item 22 in FIG. 1 of U.S. Pat. No. 4,086,329 have associated therewith about 1.0% to about 4% chloride or chlorate ions in residual mother liquor of at least about 10%. The slurrying step of the present process comprises mixing the impure sodium sulfate crystals with mother liquor in a slurrying tank. The consistency of the slurry is from about 10% to about 14% with about 12% being particularly preferred. The temperature of the slurry in the slurry tank is maintained above 65° C. (150° F.).

FIRST TRANSFER

The slurry is transferred from the slurry tank to a first holding tank by pumping the slurry through pipes (conduits) connecting the slurry tank and the first holding tank. Because of the high temperature of the slurry and the solid content, the slurry is a difficult fluid to pump and it is quite difficult to seal the pump against leakage. It is critical in practicing the present invention that water seals not be used for sealing when pumping the slurry because water enters the system through the water seals.

NON-EVAPORATIVE SEPARATION

When there is sufficient slurry in the first holding tank for operation of the non-evaporative separation, the slurry is transferred by pumping to separators for separation of the sodium sulfate crystals from the mother liquor without substantial evaporation of the mother liquor. At least 90% of the mother liquor must be separated from the crystals by this non-evaporative solid/liquid separation step. The separation can be performed in one or more steps and is preferably performed by cyclone separation followed centrifugal separation.

DRYING

Remaining mother liquor associated with the 90% or drier crystals produced in the non-evaporative separation step is evaporated to produce dry sodium sulfate crystals having a particle size of about 100% −45 mesh and at least 90% +200 mesh (Tyler series by weight) and having less than 0.2% chloride ions. This evaporative drying step is preferably performed in a flash dryer although other suitable equipment could be used.

COLLECTING

Mother liquor separated from the crystals in the non-evaporative separation step is collected and transferred to a second holding tank.

MOTHER LIQUOR RECYCLE

Mother liquor from the second holding tank is recycled to the slurry tank or returned to the chlorine dioxide generating process as a bleed stream.

CHLORIDE ION CONTROL

A portion of the mother liquor is removed from the process and preferrably returned to the chlorine dioxide generating process as a bleed stream to control the total chloride ion content of the mother liquor in the purification process. Sufficient mother liquor is removed as a bleed stream from the purification process to keep the chloride ion content of the mother liquor in the purification process at less than 20% and preferably at about 10%. Water is added to replace the mother liquor removed as a bleed stream.

INTERMITTENT OPERATION

The circulation of slurry from the slurry tank to the first holding tank and from the first holding tank to the separation step, is interrupted whenever the amount of impure sodium sulfate crystals in the slurry tank and first holding tank is less than a predetermined amount for efficient operation of the non-evaporative separation step of the purification process. This occurs whenever the demand for chlorine dioxide decreases or is eliminated due to fluctuations in the production rate of pulp for which the chlorine dioxide is used as a bleaching chemical. The predetermined amount of slurry depends upon the operating characteristics of the separators because a minimum amount of crystals is required in order for separation to occur and this minimum amount depends upon the characteristics of the conventional separators employed. Whenever there is not sufficient slurry available for operating the non-evaporative separation step of the process, hot mother liquor i.e. >65° C., (>150° F.) without crystals is circulated through the transfer lines interconnecting the slurry tank, the first holding tank, the separators and the second holding tank in order to prevent the cooling of the contents of the lines to below 65° C. (150° F.) A minimum quantity of mother liquor is required in said tanks for said hot mother liquor circulation. This minimum amount is equal to the volume of the transfer lines and the pumps. This circulation of the mother liquor is stopped whenever the quantity of available mother liquor is less than said minimum quantity needed for circulation. All transfer lines and pumps are then immediately flushed with hot water (at least 65° C., 150° F.), whenever the circulation of mother liquor is stopped, to remove all slurry and mother liquor prior to cooling the lines to below 150° F.

SYSTEM TEMPERATURE

The slurry tank and the holding tanks are heated to maintain all the mother liquor and slurry through the process at a temperature greater than 65° C. (150° F.). The heated mother liquor and slurry is circulated, throughout all transfer conduits at a circulation rate and temperature of the mother liquor or slurry that is sufficient to maintain the temperature of the mother liquor contained in all transfer lines and pumps at a temperature of at least 65° C. (150° F.) without steam tracing, electrical tracing or otherwise externally heating the transfer lines and pumps.

OPERATION OF THE PROCESS

There are three modes of operation for the improved purification process comprising the situations of purification, standby for purification and water flushing.

Purification mode of operation for the process occurs when the amount of sodium sulfate crystals in the mother liquor contained in the first holding tank and slurry tank is above the minimum amount predetermined for operation of the separation equipment and also the amount mother liquor contained in the slurry tank, first holding tank and second holding tank is sufficient for circulation throughout the process and for maintaining the slurry at a consistency of between 10% and 14%.

Standby operation of the purification process occurs when the amount of sodium sulfate crystals to be purified is below the predetermined amount for operation of the separators but the amount of mother liquor is sufficient for circulation throughout the process for temperature maintenance and slurry make-up. In the standby mode, the mother liquor is circulated from the slurry tank to the first holding tank, from the first holding tank to the separators, from the separators to the second holding tank. During the standby mode of operation of the process, the mother liquor in the tanks is heated to maintain the temperature of the mother liquor greater than 65° C. (150° F.) and the circulation rate of mother liquor through the transfer lines by the pumps is sufficient to maintain the temperature of the mother liquor in the transfer lines and pumps at 65° C. (150° F.) or greater.

Water flushing mode of operation occurs prior to any shutdown of the processes. The process must be water flushed when the amount of mother liquor is insufficient for circulation of mother liquor for temperature maintenance in the transfer lines. During the water flush mode, all the transfer lines and pumps, i.e., interconnecting the slurry tank, the first holding tank, the separators and the second holding tank, are flushed clean of mother liquor with hot water of 65° C. or hotter. Once flushed, the process equipment and connecting pipes can be cooled below 65° C. (150° F.) and the process can be shut down if desired until such time as there is sufficient mother liquor to enter the standby mode of operation and then enter the purification mode of operation when sufficient sodium sulfate crystals are available.

Pumping of mother liquor or a slurry of mother liquor and sodium sulfate crystals at 65° C. is preferably accomplished with rotary pumps although the selection of a particular pump is not critical to the practice of the invention. It is critical that the seals on the pump not be water seals. A mechanical seal is preferred. From a classical analysis of the pumping requirements, and the need to seal the pumps, water seals are the most logical choice because they eliminate leakage of mother liquor and minimize scoring or erosion of the pump seals caused by penetration of crystals into the pump seal area. Water seals accomplished this by employing a water pressure in the seal greater than the fluid pressure in the pump. However, the process of the present invention has been discovered to be very sensitive to the addition of water which inherently occurs through the use of water seals. Often, the process is operated in a standby mode and water would constantly be added to the mother liquor through the water seals thereby diluting the mother liquor from the required saturated condition. If the mother liquor is not saturated, the addition of crystals to the mother liquor will cause the crystals to dissolve in the mother liquor and prevent their separation from the mother liquor by the non-evaporative separation step which is performed with solid/liquid separating apparatus. Accordingly, it has been discovered that despite the obvious advantages of employing a water seal when pumping fluids like the slurry or mother liquor, it is critical to the process of the present invention that water seals not be used. This is mainly because of the intermittent operation of the purification mode of the process and prolonged operation of the process in a standby mode constantly circulating mother liquor and ready to receive sodium sulfate crystals for purification. Mother liquor by its very nature must be saturated with sodium sulfate. Sodium sulfate is very soluble in water which solubility is enhanced by the elevated temperature employed in the present invention and accordingly water addition to the process must be avoided.

Transfer lines and transfer pumps must be maintained at a temperature of 65° C. (150° F.) or higher whenever mother liquor or mother liquor and sodium sulfate crystals (slurry) are present. The usual procedure of heat trace the lines and the pump usually with electric resistence heating or steam pipes has been discovered to cause corrosion even of stainless steel pipes (316ss). Unexpectedly, stainless steel pipes rapidly corrode when the lines were heat traced. However, stainless steel or even inexpensive low carbon, high nickle steel piping without heat tracing did not show signs of corrosion after similar exposure to hot sodium sulfate solution but without heat tracing. Accordingly, it is critical to the present invention that the elevated temperature of the transfer lines and pumps be maintained through circulation of hot mother liquor and not by heat transfer into the lines and pumps through their walls.

Separation of the sodium sulfate crystals from the mother liquor without substantial evaporation of the mother liquor (non-evaporative separation) results in crystals without substantial amounts of chloride or chlorate contamination because the chloride and chlorates remain with the separated mother liquor (filtrate). Separation preferably is accomplished in two stages, first by a cyclone separator to produce approximately 40% to 70% dry sodium sulfate crystals (60% to 30% mother liquor) followed by centrification to produce crystals at least 90% dry (less than 10% mother liquor). Subsequent evaporative drying as in a flash dryer produces sodium sulfate crystals having high purity and excellent particle size. The particular apparatus used to separate the crystals from the mother liquor without significant evaporation is not critical to the present invention. For purity, it is necessary that at least 90% dry sodium sulfate crystals be achieved without substantial evaporation. Substantial evaporation of the mother liquor has not occurred during separation if the final product contains less than about 12% of the chloride or chlorate values associated with the impure crystals 22 entering the process. Removal of at least 90% of the mother liquor from the crystals without substantial evaporative drying results in crystals having less than 0.2% chloride and chlorate impurities. All percentages are by weight unless indicated otherwise.

Purging mother liquor from the purification process and returning it to the chlorine dioxide generation process is done in order to control the buildup of chlorides and chlorates in the mother liquor used on the purification process. By returning the purged mother liquor to the chloride dioxide generating process, the chloride and chlorate values in the mother liquor purge stream are retained in the overall chlorine dioxide generation process and sodium sulfate recovery process. The purged mother liquor can be replaced with hot water.

The pH of the mother liquor in the purification process is maintained at 7 or above in order to minimize corrosion of the piping and vessels by the mother liquor.

BRIEF DESCRIPTION OF THE DRAWINGS

The single FIGURE schematically depicts the process of the present invention.

With reference to the figure, the process is shown with impure sodium sulfate crystals, 22, from a chlorine dioxide generating process being added to a slurry make-up tank 24 to which is added water or a solution or sodium sulfate and water, preferably a saturated sodium sulfate solution (mother liquor), in sufficient quantity to produce a slurry of sodium sulfate crystals in a saturated solution of sodium sulfate. The slurry should have a solids content of between 10% and 14% by weight, preferably 12%. To prevent settling out of the crystals from the slurry, the contents of the slurry make-up tank is preferably agitated. The slurry containing from 10% to 14% solids is a pumpable mixture and accordingly is preferably transferred from the slurry tank to the first holding tank 28 with a pump 26 via transfer lines of Carpenter 20 pipe, a low carbon, high nickle, high copper steel alloy. The first holding tank 28 is preferably agitated to maintain the crystals in suspension in the slurry. Whenever the tank 28 contains sufficient slurry for operation of the separation step, the slurry is removed from tank 28 and pumped to the non-evaporative separation step for separating the crystals from the mother liquor. Preferably, separation is performed in two stages, first a cyclone type separator to remove mother liquor from the crystals to produce a mixture of about 40% crystals by weight, balance mother liquor. This mixture from the cyclone type separator is preferably centrifuged to remove additional mother liquor from the crystals and produce a mixture 36 comprising at least 90% by weight sodium sulfate crystals. Dry sodium sulfate crystals are then produced from mixture 36 by evaporating the remaining mother liquor associated with the crystals in a dryer. Either heat or vacuum or a combination thereof can be used for the evaporative drying of the remaining mother liquor.

The product from the dryer has unique characteristics in terms of particle size and purity. By keeping the crystals and mother liquor at a temperature of 65° C. (150° F.) or higher and at a pH of 7 or higher a crystal is obtained in the particle size range of about 100%−45 mesh and at least 90%+200 mesh (essentially 100% passed through a 45 mesh Tyler series screen and 95% is retained on a 200 mesh screen.

Mother liquor separated from the crystals in the non-evaporative separation step depicted in the figure by the cyclone and centrifuge apparatus is collected and stored in the holding tank. Mother liquor 40 is withdrawn from the holding tank and recycled, 44 to the slurry tank in an amount needed to mix with the solids 22 to produce a slurry of crystals and mother liquor at a consistency in the range of 10% to 14% in slurry tank 24. A portion of the mother liquor 48 from the holding tank is returned to the chlorine dioxide generating process in an amount sufficient to prevent the chloride and chlorate content of the mother liquor in the holding tank from building up above 20% expressed as chloride ions.

We claim:

1. A purification process for sodium sulfate crystals comprising:
   (a) slurrying impure sodium sulfate crystals obtained intermittently from a chlorine dioxide generation process with a mother liquor in a slurry tank;
   (b) transferring the slurry into a first holding tank;
   (c) transferring slurry from the first holding tank to a separating step;
   (d) separating the crystals from the mother liquor without substantial evaporation of the mother liquor to yield crystals having less than 10 % mother liquor remaining thereon;
   (e) drying the crystals after separation step d to evaporate the remaining mother liquor to produce a sodium sulfate crystal in the particle size of about 100 %−45 mesh and at least 90 %+200 mesh (Tyler series) and having less than 0.2 % chloride ions;
   (f) collecting the mother liquor from the separation step;
   (g) transferring the collected mother liquor to a second holding tank;
   (h) transferring mother liquor from the second holding tank and recycling it to the slurry tank for slurry make up;
   (i) removing mother liquor as a bleed stream to control the total chloride ion content of the mother liquor;
   (j) transferring mother liquor without crystals instead of the transfer of slurry in from the steps b and c when the amount of impure sodium sulfate crystals from the chlorine dioxide generation process is less than a predetermined amount for efficient operation of said separating step;
   (k) pumping the mother liquor or slurry through conduits to effectuate transfer between the tanks in steps b, c, g, h and j without the addition of water during pumping;
   (l) maintaining the mother liquor and slurry in said tanks and during transfer in steps b, c, g, h, and j at a pH of at least 7 and at a temperature greater than 65° C.(150° F.) by heating in the tanks and without adding heat through the transfer conduits; and
   (m) flushing all transfer conduits with water at a temperature of about 65° C. or higher to remove all slurry and mother liquor prior to any cooling of the contents of said tanks and transfer conduits below 65° C. (150° F.) in preparation for a shut down of the process and cooling down of the transfer conduits;

2. The process of claim 1 wherein the mother liquor bleed stream is returned to the chlorine dioxide generating process.

* * * * *